(12) United States Patent
Gruber

(10) Patent No.: US 6,773,047 B2
(45) Date of Patent: Aug. 10, 2004

(54) LIFT ASSIST MECHANISM FOR VEHICLE TAILGATES

(75) Inventor: Herbert Gruber, Rochester Hills, MI (US)

(73) Assignee: Multimatic, Inc., Markham (CA)

(*) Notice: Subject to any disclaimer, the term of this patent is extended or adjusted under 35 U.S.C. 154(b) by 0 days.

(21) Appl. No.: 10/473,151

(22) PCT Filed: Feb. 4, 2003

(86) PCT No.: PCT/CA03/00134
§ 371 (c)(1),
(2), (4) Date: Sep. 29, 2003

(87) PCT Pub. No.: WO03/067010
PCT Pub. Date: Aug. 14, 2003

(65) Prior Publication Data
US 2004/0108743 A1 Jun. 10, 2004

Related U.S. Application Data
(60) Provisional application No. 60/354,482, filed on Feb. 8, 2002.

(51) Int. Cl.⁷ ............................................. B62D 33/03
(52) U.S. Cl. ....................................... 296/57.1; 49/386
(58) Field of Search ................. 296/57.1, 50, 146.11, 296/146.8; 16/277; 49/386

(56) References Cited

U.S. PATENT DOCUMENTS

| 3,122,775 | A |   | 3/1964  | Pulleyblank             |
|-----------|---|---|---------|-------------------------|
| 4,291,501 | A |   | 9/1981  | Steinberg et al.        |
| 5,271,652 | A | * | 12/1993 | Watanabe et al. ... 296/36 |
| 5,358,301 | A |   | 10/1994 | Konchan et al.          |
| 5,988,724 | A | * | 11/1999 | Wolda ............ 296/57.1 |
| 6,196,609 | B1 | * | 3/2001  | Bowers .......... 296/57.1 |

FOREIGN PATENT DOCUMENTS

FR 2796097 1/2001

* cited by examiner

Primary Examiner—Joseph D. Pape
(74) Attorney, Agent, or Firm—Kramer & Amado, P.C.; Gordon J. Zimmerman, Esq.

(57) ABSTRACT

A vehicle tailgate lift system comprises an energy storage device located within a vehicle body and adapted to be pivotally anchored to the vehicle body at one end, a bellcrank arm that is pivotally attached to the energy storage device and rigidly attached to an actuation shaft that is coaxially aligned with a tailgate pivot axis, a pivot bracket assembly that incorporates a pivot bearing arrangement to facilitate a robust rotary joint about the tailgate pivot axis, and comprising a coupling arrangement between the tailgate and the actuation shaft, such that relative rotary motion of the tailgate and vehicle body results in linear movement of the energy storage device and maximum energy storage at the tailgate fully open position.

12 Claims, 11 Drawing Sheets

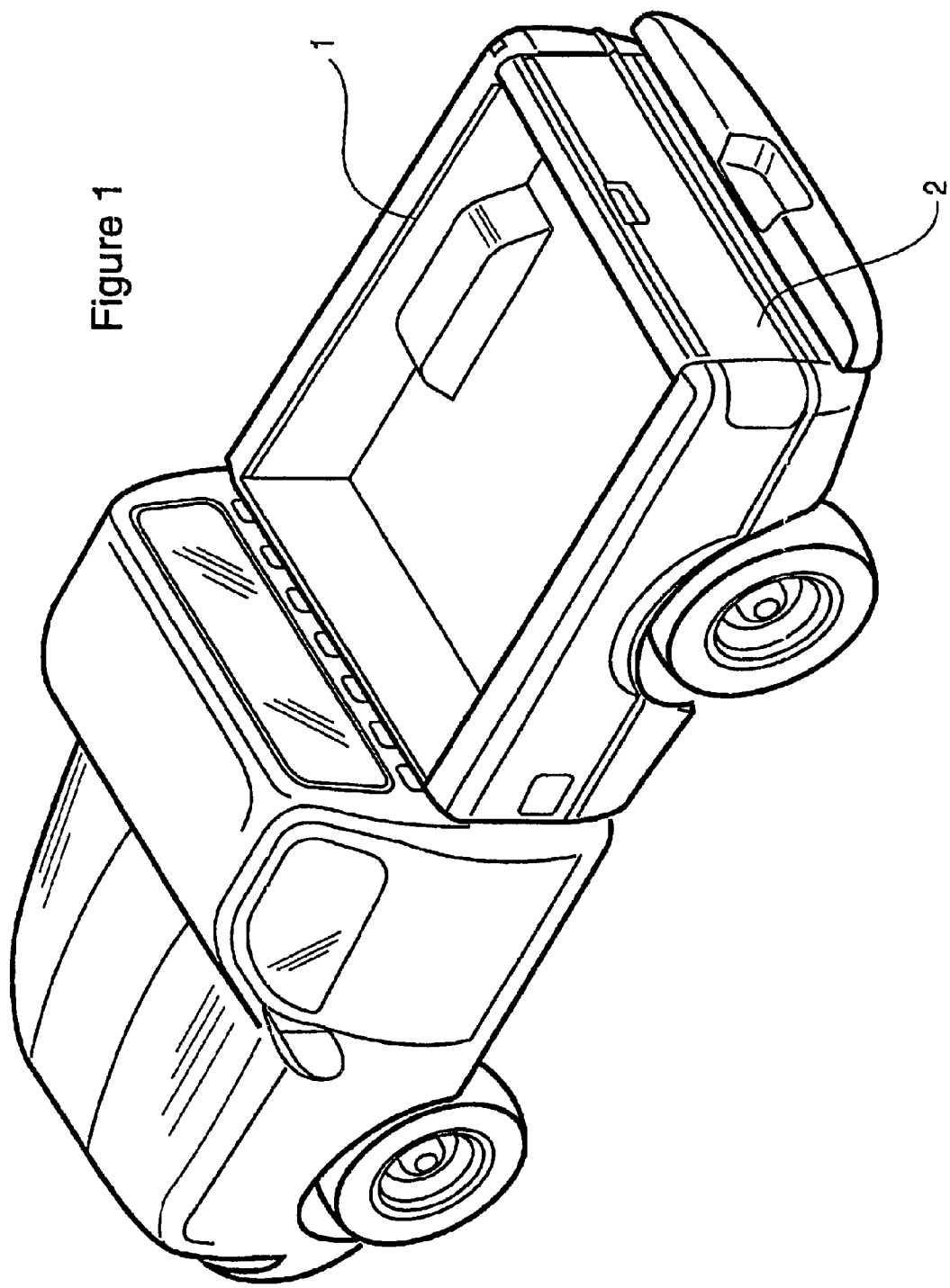

LIFT ASSIST MECHANISM FOR VEHICLE TAILGATES

FIELD OF THE INVENTION

This invention applies to pivotable closure panels on vehicles, in particular to closure panels that rotate about their lower edge and require significant effort on the part of the operator to open and close, such as vehicle tailgates.

DESCRIPTION OF THE PRIOR ART

Although it is common practice not to provide vehicle tailgates with lift assistance, there have been numerous devices suggested in the prior art that are configured to do so. With the continued sophistication of vehicle systems and the addition of comfort and convenience items, tailgates are becoming increasingly heavier and lift assistance devices will become a requirement. The most common form of tailgate assist outlined in the prior art uses a torsion spring packaged with the tailgate that stores energy in response to opening angle.

U.S. Pat. No. 5,358,301 issued to Konchan et al discloses a torque rod counterbalance spring carried in the tailgate panel that is torsionally wound when the panel is pivoted away from the panel removal position. The torque rod is straight and oriented coaxially with the tailgate pivot brackets. The energy stored in the torque rod assists the operator in lifting the tailgate up to the removal position. The tailgate panel can be removed from the vehicle in the removal position as two features on the pivot bracket are aligned. Unfortunately, the system described in Konchan adds significant weight to the overall tailgate mass and therefore makes the assembly difficult to manage when removed.

U.S. Pat. No. 5,988,724 issued to Wolda discloses a similar mechanism to Konchan et al but utilizing a horseshoe-shaped torque rod that can be rapidly installed as an option. Other than the capability of having the torque rod independent of the pivot brackets and therefore capable of optional usage, the device described in Wolda is similar to that of Konchan et al and suffers the same weight penalty over an unassisted panel.

There is another large class of lift assist systems that are configured to be mounted to a body structure and act upon the pivotable closure panel with a direct force. These types of devices are utilized extensively on closure panels that pivot at their upper edge such as vehicle liftgates for vans and the like. These devices would also be suitable for usage on a tailgate but would require large packaging volume due to their requirement to act on the closure panel at a distance from the hinge pivot bracket axis. Additionally, because they mount to the body structure, they would hinder the removal of the tailgate from the vehicle. Unlike vehicle liftgates, simple removal of tailgates is a requirement of most tailgate systems.

U.S. Pat. No. 4,291,501 issued to Steniberg et al discloses a device for counterbalancing a swiveable body part or closure panel on a motor vehicle using a torsion bar with integrated crank. The torsion bar is packaged externally from the closure panel and is not coaxial to the pivot bracket axis therefore creating a large packaging volume requirement.

In addition to torsion bars, a wide range of other energy storage devices are utilized to generate direct forces on closure panels in a similar manner to Steniberg et al. These devices include, but are not limited to, extension springs, compression springs, clock springs and gas springs.

SUMMARY OF THE INVENTION

Accordingly, it would be advantageous to provide a simple lift assist system for a vehicle tailgate that is easily disengaged and does not substantially increase the weight of the tailgate, so that removal of the tailgate from the vehicle is unimpaired. Additionally, is would be advantageous to arrange the lift assist system to impart a torque and orient it coaxially with the tailgate pivot axis so that packaging volume is minimized and the relatively simple removal process of a conventional prior art tailgate is maintained.

The present invention provides a lift assist system for a vehicle tailgate utilizing an energy storage device packaged in the vehicle structure. The energy storage device is configured so as to impart a torque on an actuation shaft via a bellcrank. The actuation shaft is placed in coaxial alignment with the tailgate pivot bracket axis and is configured with a slot drive feature that couples it to the tailgate in cooperation with a conventional prior art pivot bracket assembly. The slot drive feature automatically decouples without operator intervention when the tailgate is removed in a conventional manner as known in the prior art. The slot drive feature, bellcrank and actuation shaft are arranged so as to impart an increasing lift assist torque on the tailgate in response to pivotally opening the tailgate. In the preferred embodiment of the present invention the slot drive arrangement is configured to disengage the lift assist torque at an intermediate position of the tailgate that coincides with the removal position dictated by a conventional prior art pivot bracket assembly. In this manner the lift assist stop and tailgate removal position occur at the same position which significantly simplifies the removal and reinstallation process. Additionally the energy storage device can be configured to incorporate viscous damping in the compression direction so that the opening velocity of the tailgate can be limited.

Accordingly, in a principal aspect of the invention, a vehicle tailgate lift assist system comprises a vehicle tailgate adapted to open and close by rotating about a tailgate pivot axis in relation to a vehicle body, an energy storage device located within the vehicle body and adapted to be pivotally anchored to the vehicle body at one end, a bellcrank arm pivotally attached to the energy storage device and rigidly attached to an actuation shaft that is coaxially aligned with the tailgate pivot axis, a pivot bracket assembly comprising a pivot bearing arrangement to facilitate a robust rotary joint about the tailgate pivot axis, and comprising a coupling means between the tailgate and the actuation shaft, such that relative rotary motion of the tailgate and the vehicle body results in linear movement of the energy storage device and maximum energy storage at the tailgate fully open position.

In further aspects of the invention:

a) the energy storage device is a gas spring;

b) the gas spring incorporates viscous damping in the compression direction to limit the opening velocity of the tailgate;

c) the energy storage device is a coil spring, elastomer or similar resilient material;

d) the coupling means between the tailgate and actuation shaft comprises a slot drive arrangement that can be simply decoupled to allow the removal of the tailgate;

e) the slot drive arrangement is configured to disengage the closing assist torque at an intermediate position of the tailgate which is configured to coincide with the removal position of a tailgate pivot bracket system.

Further aspects of the invention will become apparent from the following description.

BRIEF DESCRIPTION OF THE DRAWINGS

FIG. 1 is a perspective view of a typical pick-up truck cargo box with a pivotable tailgate closure panel shown in its fully closed position;

DETAILED DESCRIPTION OF THE PREFERRED EMBODIMENT

Figure 1A:
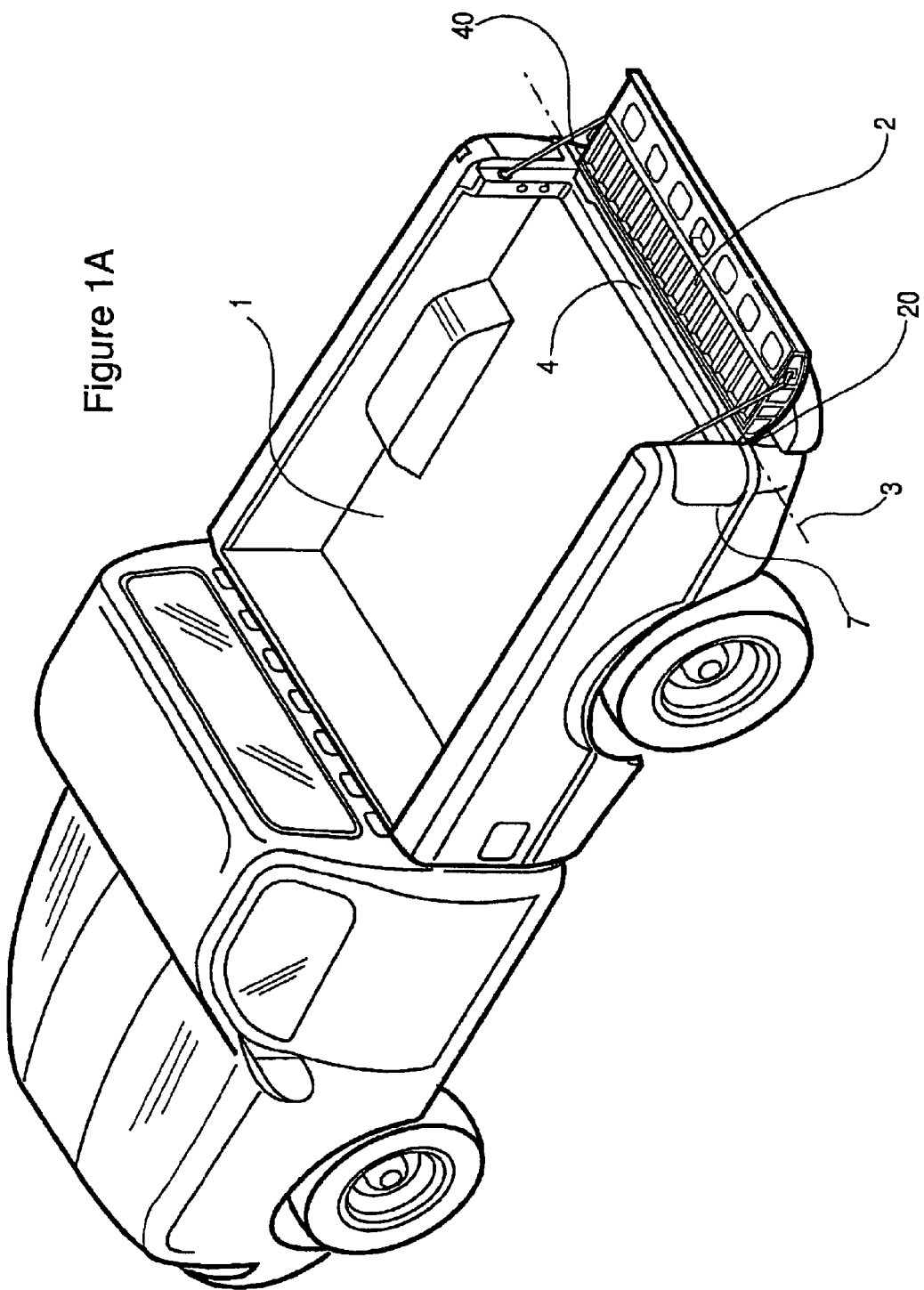
FIG. 1A is a perspective view of a typical pick-up truck cargo box with a pivotable tailgate closure panel shown in its fully open position.
Figure 3:
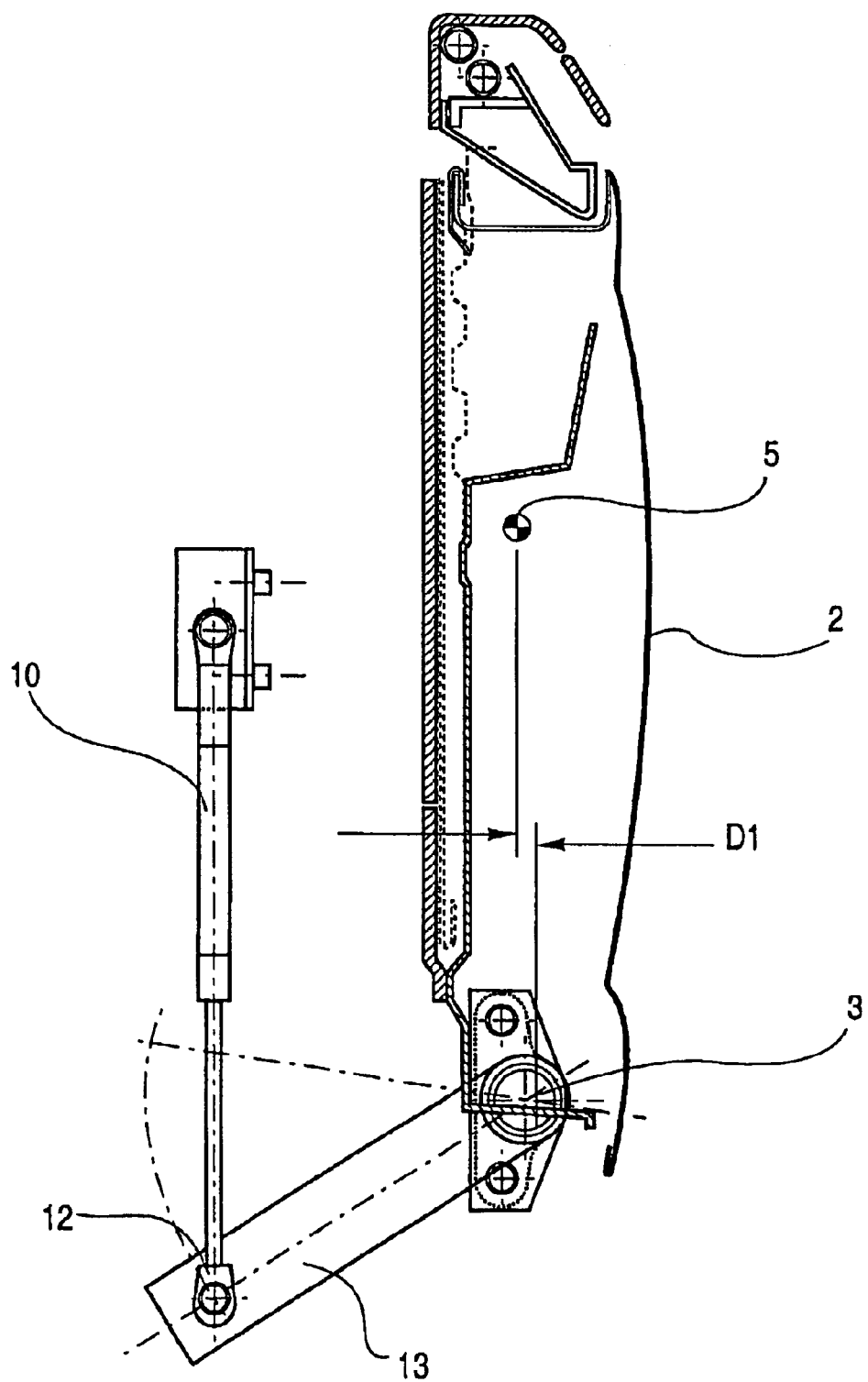
FIG. 3 is a partial sectional view of an embodiment of the present invention showing the pivotable tailgate closure panel in its fully closed position.
Figure 4:
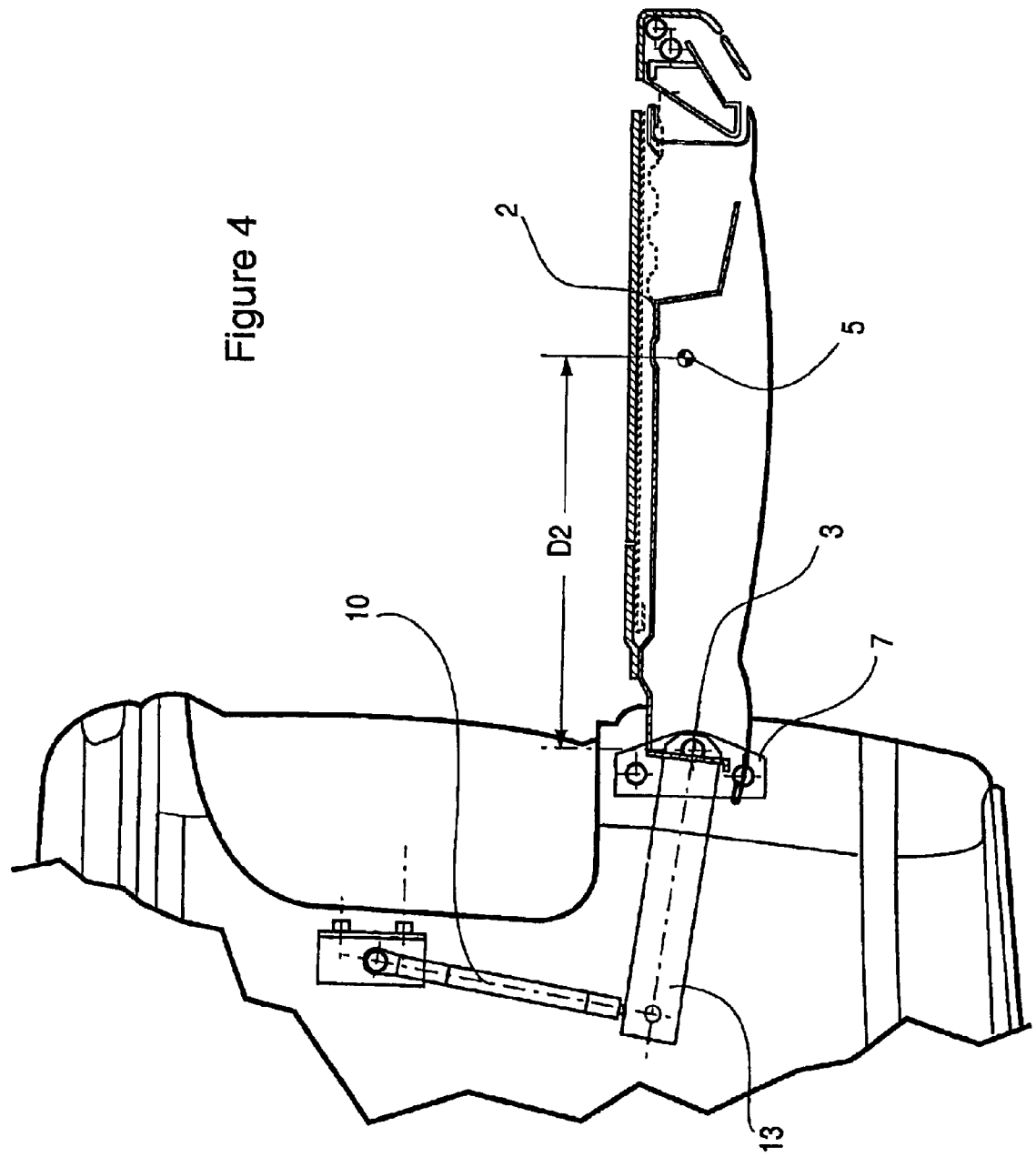
FIG. 4 is a partial sectional view of an embodiment of the present invention showing the pivotable tailgate closure panel in its fully open position.

FIG. 1 illustrates a standard pick-up truck cargo box (1) with a pivotable tailgate closure panel (2) installed in its fully closed position. The tailgate (2) is configured to rotate about a pair of body pivot brackets (20)(40) that define a pivot bracket axis (3) located in close proximity to the lower edge (4) of the tailgate (2). FIG. 1A illustrates the tailgate (2) rotated about the pivot bracket axis (3) into its fully open position. As the tailgate rotates from its fully closed position to its fully open position, its centre of mass (5) moves rearward from the pivot bracket axis (3) and significantly increases the required closure force. FIG. 3 illustrates the tailgate (2) in its fully closed position with its centre of mass (5) offset slightly forward of the pivot bracket axis (3). This offset, with dimension D1, creates a slight closure assist as illustrated. FIG. 4 illustrates the tailgate (2) in its fully open position with its centre of mass (5) offset by a large amount rearward of the pivot bracket axis (3). This offset, with dimension D2, creates a large opening torque that the operator must overcome to close the tailgate.

Figure 2:
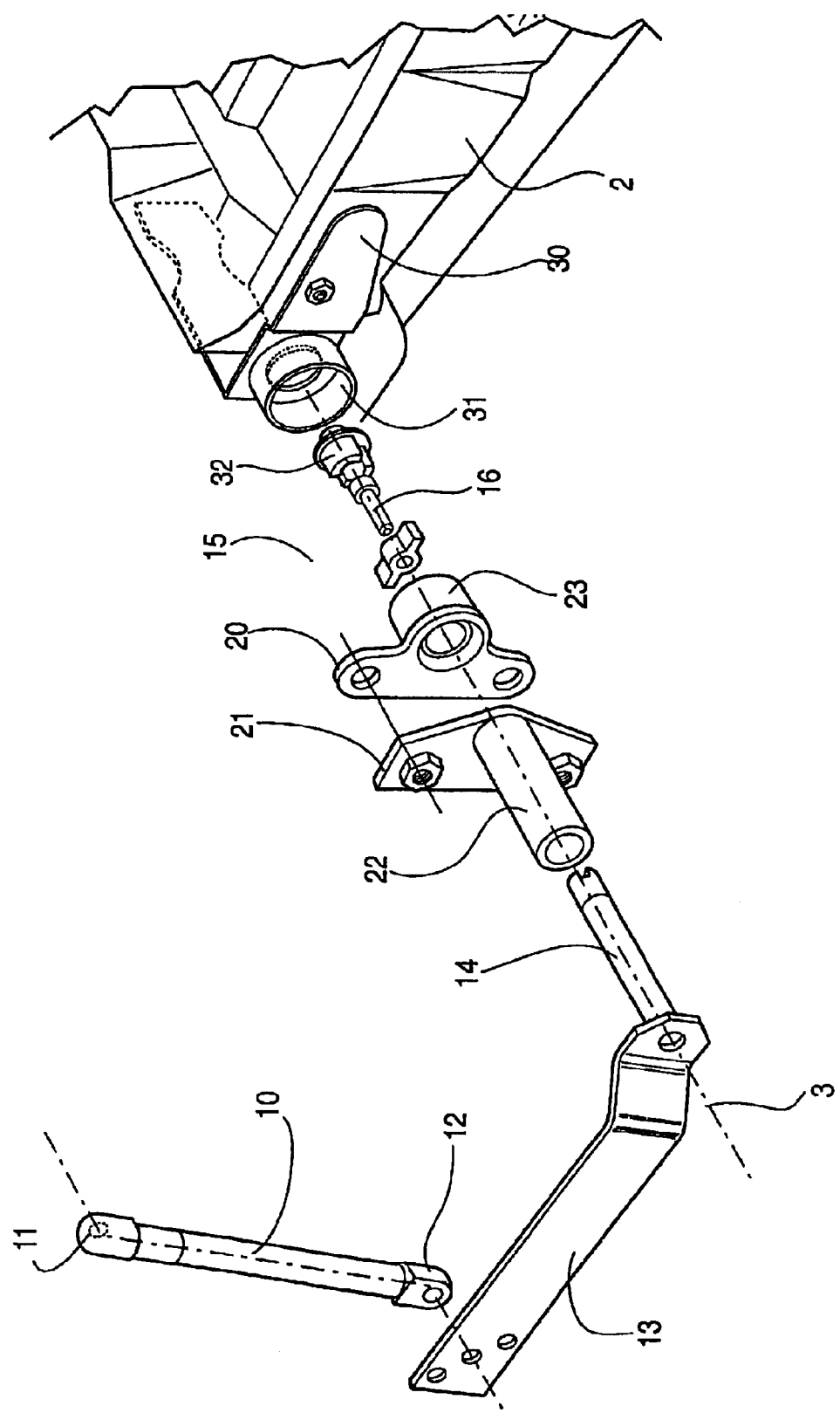
FIG. 2 is a partial exploded perspective view of components of a mechanism of the present invention.
Figure 6:
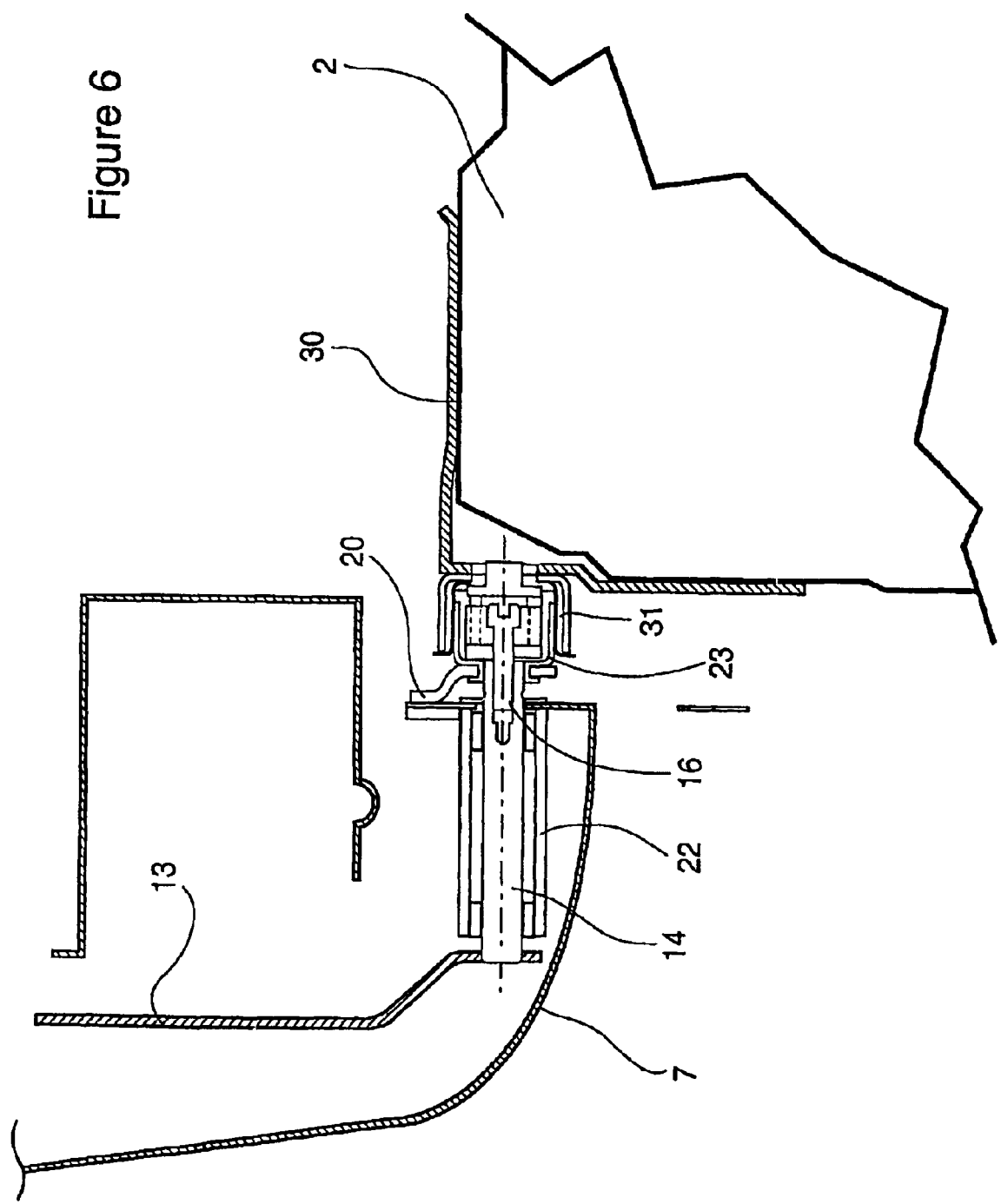
FIG. 6 is a partial longitudinal sectional view of a mechanism of the present invention.

In a preferred embodiment of the present invention, illustrated in FIG. 2 and FIG. 6, a gas spring (10) energy storage device is located in the pick-up truck cargo box body side (7) with an anchored end (11) pivotally attached to the body, and a moving end (12) pivotally attached to a bellcrank arm (13). The bellcrank arm (13) is rigidly attached to an actuation shaft (14) that is rotatably guided within a sleeve structure (22) of a pivot bracket backing plate (21). The pivot bracket backing plate (21) and body pivot bracket (20) are configured to rigidly mount to the pick-up box body side (7) so that they sandwich the body side sheet metal between them. In this way, an extremely rigid joint is achieved with the sleeve structure (22) and actuation shaft (14) being located and kept in alignment with the pivot bracket axis (3). A male slot drive feature (15) is coaxially attached to the actuation shaft (14) via a screw (16). The screw (16) also retains the actuation shaft (14) and entire pivotable assembly in the rigid body pivot bracket (20) while allowing rotational motion. The body pivot bracket (20) also contains an external bearing surface feature (23).

A tailgate pivot bracket (30) is rigidly attached to the tailgate (2) and is configured with an internal bearing surface feature (31). A female slot drive feature (32) is rigidly mounted to the tailgate pivot bracket (30) in coaxial alignment with the internal bearing surface feature (31). When the tailgate (2) is mounted to the pick-up truck cargo box (1) for normal operation, the internal bearing surface feature (31) of the tailgate pivot bracket (30) interfaces with the external bearing surface feature (23) of the body pivot bracket (20) creating a robust rotary joint. Additionally, the male slot drive feature (15) interlocks with the female slot drive feature (32) of the tailgate pivot bracket (30) so that rotary motion of the tailgate (2) is directly transferred to the actuation shaft (14) via the interlocking slot drive features. In this way the gas spring (10) is actuated in a linear manner via the bellcrank arm (13) in response to the rotary motion of the tailgate (2).

The bellcrank arm (13) and gas spring (10) are oriented or configured so that maximum energy storage is achieved at the tailgate (2) fully open position, as shown in FIG. 4. As the tailgate (2) is closed, the energy stored in the gas spring (10) provides significant lift assistance to the operator. As the tailgate closes the offset dimension (D) between the pivot bracket axis (3) and centre of mass (5) decreases, thus requiring less operator effort to complete the closure. At the same time, as the tailgate closes, the energy stored in the gas spring (10) decreases and with correct tuning drops in a proportional manner to the offset dimension (D). If properly configured, the gas spring (10) and bellcrank arm (13) system can keep the required operator effort low and almost constant through the lift range. Additionally the gas spring (10) can be configured to incorporate viscous damping in the compression direction so that the opening velocity of the tailgate (2) can be limited.

Figure 5:
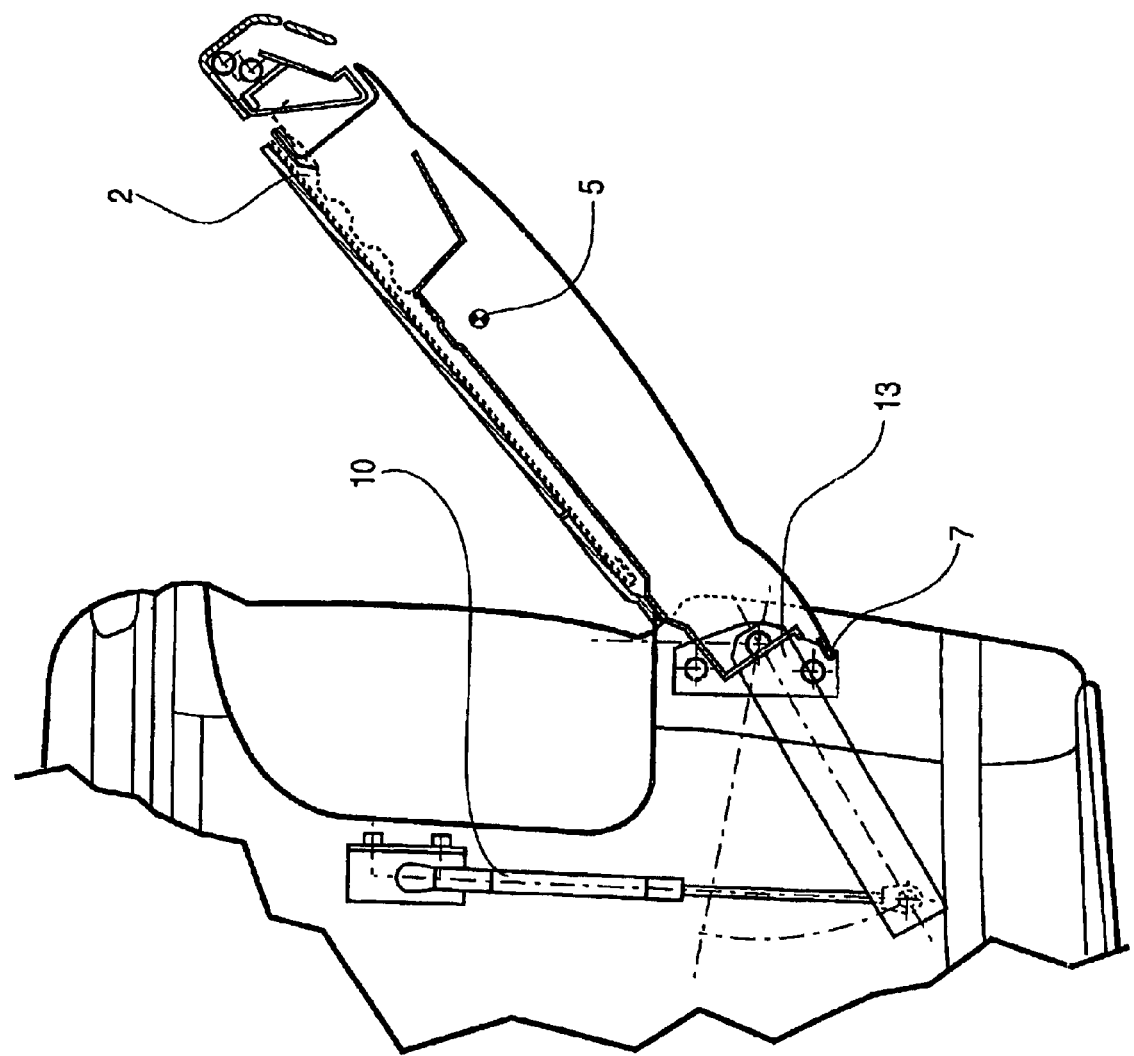
FIG. 5 is a partial sectional view of an embodiment of the present invention showing the pivotable tailgate closure panel in an intermediate open position.
Figure 8:
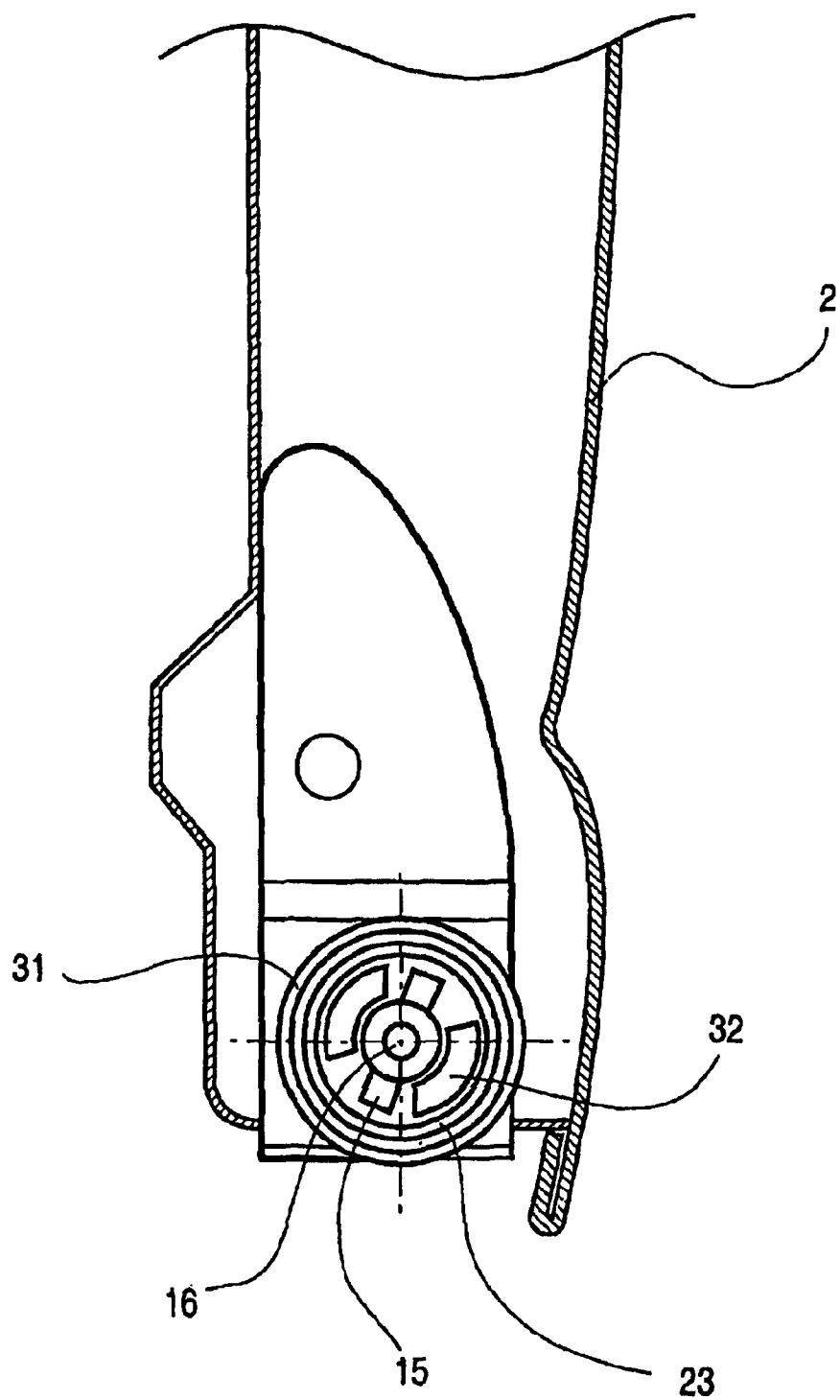
FIG. 8 is a partial sectional view of an embodiment of the present invention showing the pivotable tailgate closure panel in its fully closed position and the slot drive arrangement in a disengaged state.

In the preferred embodiment, the slot drive arrangement is configured to disengage at an intermediate position of the tailgate (2) as illustrated in FIG. 5 and FIG. 8. In this configuration, the tailgate (2) has no lift assist force imparted through the final closing motion. This has been found to be an acceptable compromise as the required operator effort is relatively low from this intermediate position due to the offset dimension (D) being proportionally small due to the non-linear nature of the trigonometry that dictates the dimension. In other words, as the center of mass of the liftgate approaches a vertical line through the pivot axis, less effort is required to move the tailgate under the force of gravity.

Figure 7:
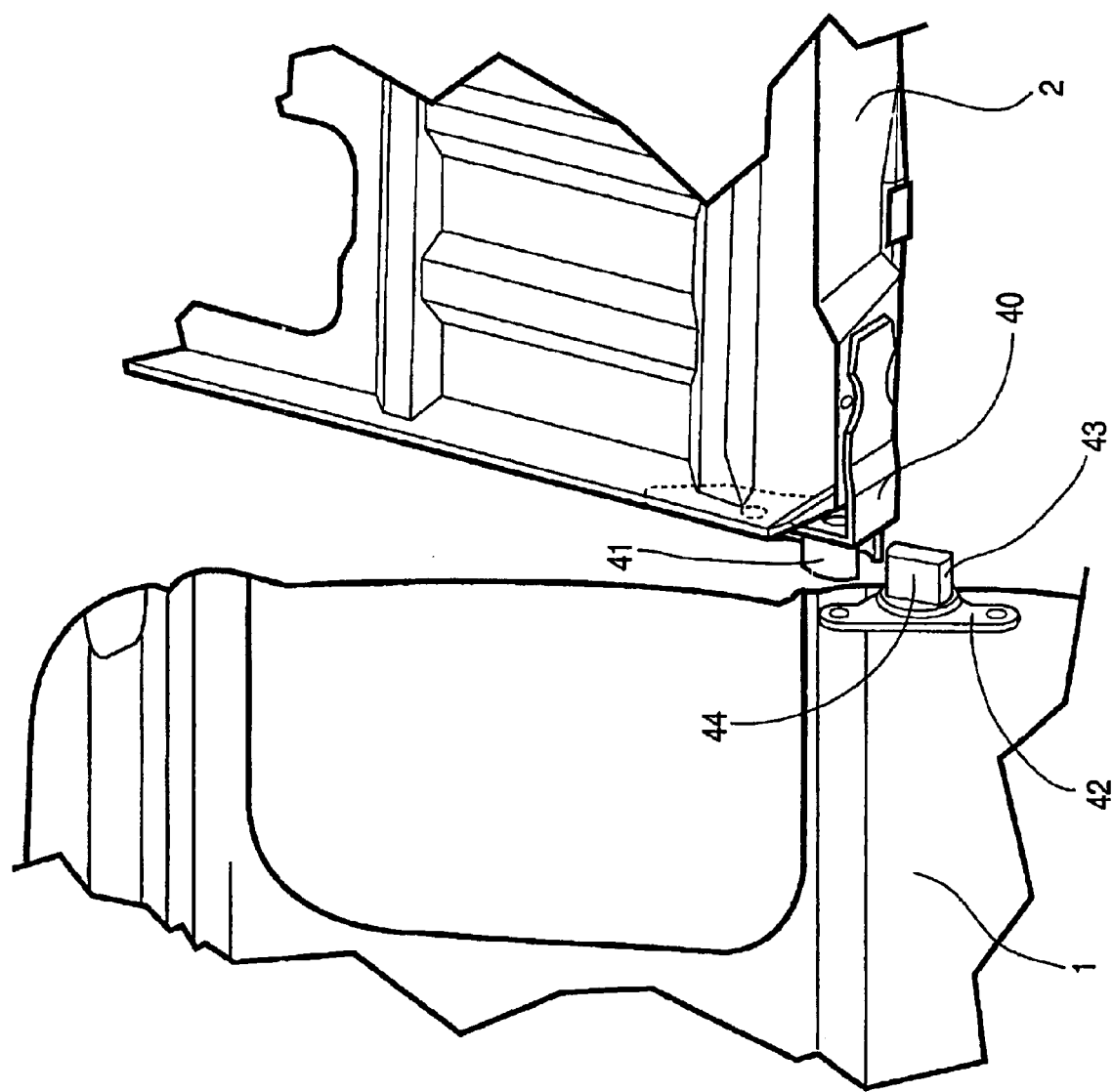
FIG. 7 is a partial perspective view of a non-assisted pivot bracket assembly.

In the preferred embodiment, the system is also configured to allow the tailgate (2) to be fully removed from the pick-up truck cargo box (1). This removal is facilitated by the pivot bracket arrangement on the side of the tailgate that is not configured for lift assist, as illustrated in FIG. 7. This side of the tailgate (2) is configured with a passive tailgate pivot bracket (40) which is known in the prior art and includes a horseshoe-shaped internal bearing surface feature (41) adapted to interface with an external bearing surface feature (43) of a body pivot bracket (42). The external bearing surface feature (43) is substantially round but includes two flat areas (44) oriented so as to allow the horseshoe-shaped internal bearing surface feature (41) to be unseated when these parts are appropriately aligned but interlocked so as to provide a robust rotary joint in all other positions. In the preferred embodiment the orientation of the horseshoe-shaped internal bearing surface feature (41) and the two flat areas (44) is such that it coincides with the intermediate position of the tailgate illustrated in FIG. 6 and FIG. 9. In this configuration, the lift assist stop and tailgate removal position occur at the same position which significantly simplifies the tailgate removal and reinstallation process. This removal-reinstallation process is the same as in the case of a tailgate with no lift assist, other than that the slot drive features of this embodiment of the invention must be aligned.

Figure 9:
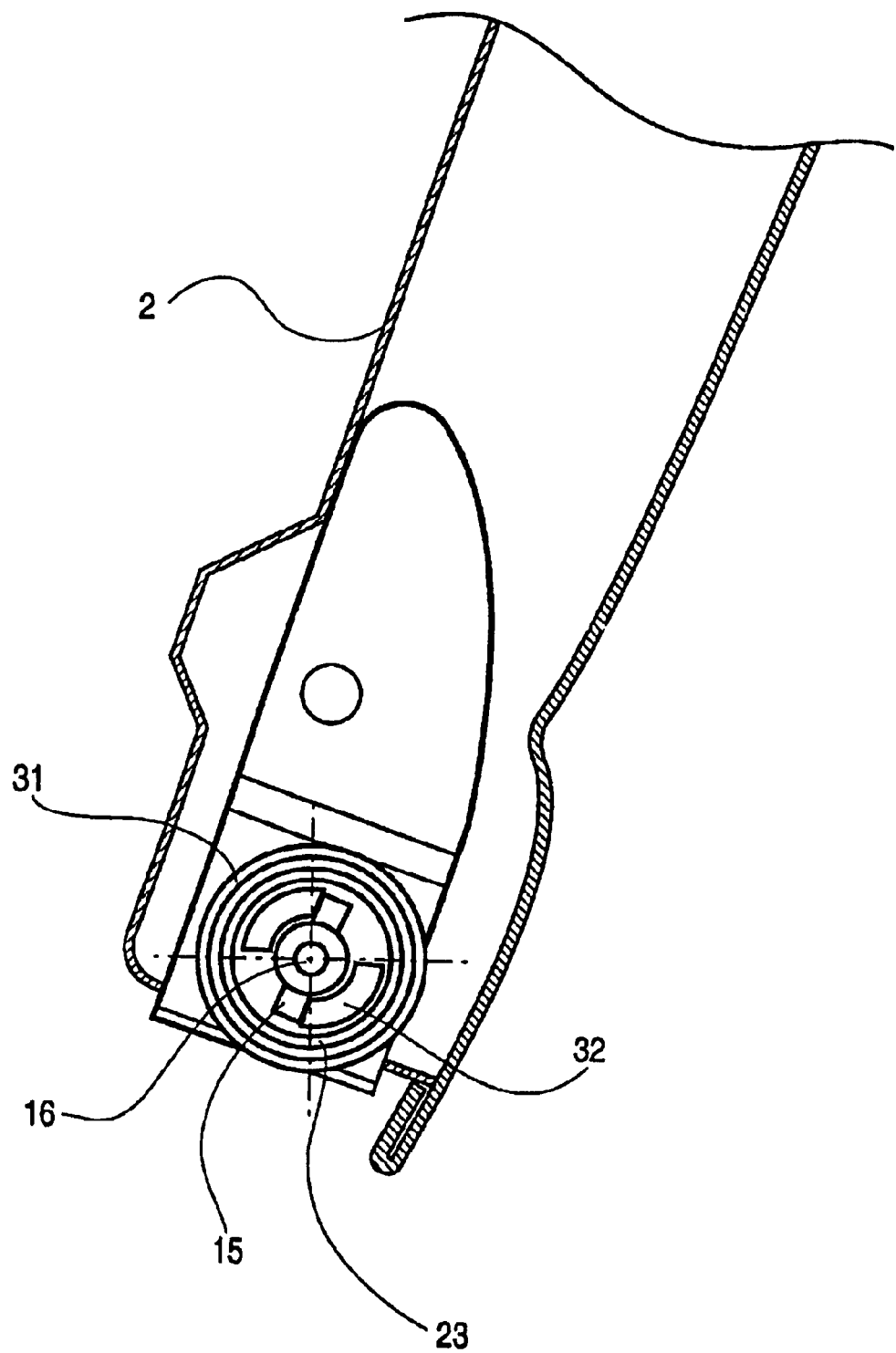
FIG. 9 is a partial sectional view of an embodiment of the present invention showing the pivotable tailgate closure panel in an intermediate open position and the slot drive arrangement in an engaged state.
Figure 10:
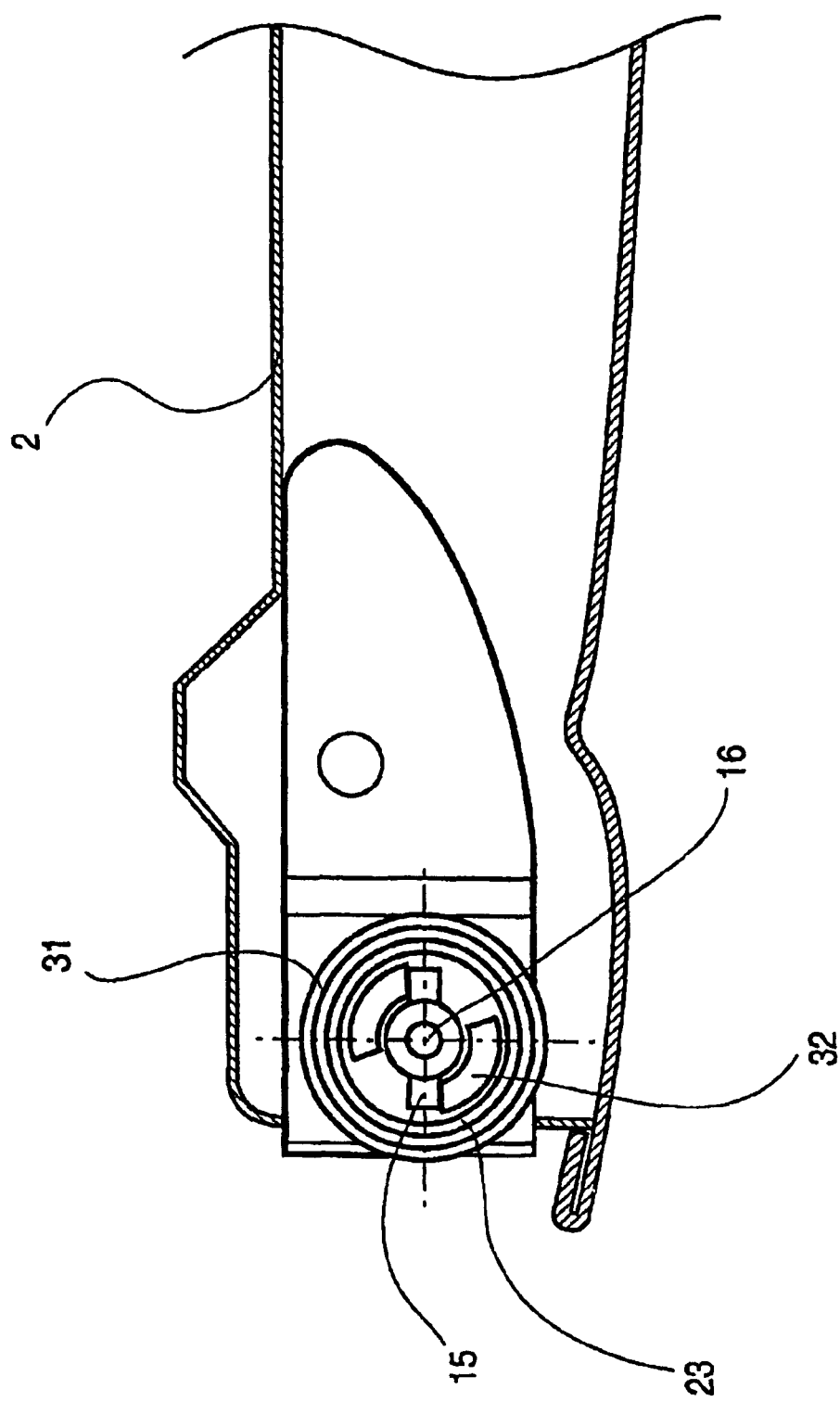
FIG. 10 is a partial sectional view of an embodiment of the present invention showing the pivotable tailgate closure panel in its fully open position and the slot drive arrangement in an engaged state.

FIG. 9 and FIG. 10 illustrate the slot drive arrangement in a coupled condition with the male slot drive feature (15) interlocking with the female slot drive feature (32) so as to transfer rotary motion and lift assist torque. FIG. 8 illustrates the slot drive arrangement in a decoupled condition with the male slot drive feature (15) free to move inside the female slot drive feature (32). This decoupled condition is arranged to occur from the intermediate position of the tailgate to the fully closed position of the tailgate.

What is claimed is:

1. A vehicle tailgate lift assist system, comprising:
   a) a vehicle tailgate adapted to open and close by rotating about a tailgate pivot axis in relation to a vehicle body;
   b) an energy storage device located within the vehicle body and adapted to be pivotally anchored to the vehicle body at one end;
   c) a bellcrank arm pivotally attached to the energy storage device and rigidly attached to an actuation shaft that is coaxially aligned with the tailgate pivot axis;
   d) a pivot bracket assembly comprising a pivot bearing arrangement to facilitate a robust rotary joint about the tailgate pivot axis, and comprising a coupling means between the tailgate and the actuation shaft;

such that relative rotary motion of the tailgate and the vehicle body results in linear movement of the energy storage device and maximum energy storage at the tailgate fully open position.

2. The vehicle tailgate lift assist system of claim 1, wherein the energy storage device is a gas spring.

3. The vehicle tailgate lift assist system of claim 2, wherein the gas spring incorporates viscous damping in the compression direction to limit the opening velocity of the tailgate.

4. The vehicle tailgate lift assist system of claim 1, wherein the energy storage device is a coil spring, elastomer or a similar resilient material.

5. The vehicle tailgate lift assist system of claim 1, wherein the coupling means between the tailgate and actuation shaft comprises a slot drive arrangement that can be simply decoupled to allow the removal of the tailgate.

6. The vehicle tailgate lift assist system of claim 2, wherein the coupling means between the tailgate and actuation shaft comprises a slot drive arrangement that can be simply decoupled to allow the removal of the tailgate.

7. The vehicle tailgate lift assist system of claim 3, wherein the coupling means between the tailgate and actuation shaft comprises a slot drive arrangement that can be simply decoupled to allow the removal of the tailgate.

8. The vehicle tailgate lift assist system of claim 4, wherein the coupling means between the tailgate and actuation shaft comprises a slot drive arrangement that can be simply decoupled to allow the removal of the tailgate.

9. The vehicle tailgate lift assist system of claim 5, wherein the slot drive arrangement is configured to disengage the closing assist torque at an intermediate position of the tailgate which is configured to coincide with the removal position of a tailgate pivot bracket system.

10. The vehicle tailgate lift assist system of claim 6, wherein the slot drive arrangement is configured to disengage the closing assist torque at an intermediate position of the tailgate which is configured to coincide with the removal position of a tailgate pivot bracket system.

11. The vehicle tailgate lift assist system of claim 7, wherein the slot drive arrangement is configured to disengage the closing assist torque at an intermediate position of the tailgate which is configured to coincide with the removal position of a tailgate pivot bracket system.

12. The vehicle tailgate lift assist system of claim 8, wherein the slot drive arrangement is configured to disengage the closing assist torque at an intermediate position of the tailgate which is configured to coincide with the removal position of a tailgate pivot bracket system.

* * * * *